(12) United States Patent
Pan (10) Patent No.: US 7,391,554 B2
(45) Date of Patent: *Jun. 24, 2008

(54) HIGH FILL-RATIO MIRROR-BASED SPATIAL LIGHT MODULATOR

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,367

(22) Filed: Aug. 25, 2006

(65) Prior Publication Data

US 2008/0062502 A1    Mar. 13, 2008

(51) Int. Cl.
*G02B 26/00* (2006.01)

(52) U.S. Cl. .................... 359/291; 359/290; 359/292; 359/295

(58) Field of Classification Search ........... 359/290, 359/291, 292, 295, 298
See application file for complete search history.

(56) References Cited

U.S. PATENT DOCUMENTS

| | | | |
|---|---|---|---|
| 5,382,961 A | 1/1995 | Gale | |
| 5,650,881 A | 7/1997 | Hornbeck | |
| 5,661,591 A | 8/1997 | Lin et al. | |
| 6,028,689 A | 2/2000 | Michalicek et al. | |
| 6,825,968 B2 | 11/2004 | Aubuchon | |
| 6,870,659 B2* | 3/2005 | Aubuchon | 359/291 |
| 6,906,848 B2* | 6/2005 | Aubuchon | 359/291 |
| 6,992,810 B2 | 1/2006 | Pan et al. | |
| 7,167,298 B2* | 1/2007 | Pan | 359/291 |
| 2004/0165249 A1 | 8/2004 | Aubuchon | |
| 2005/0128564 A1 | 6/2005 | Pan | |

FOREIGN PATENT DOCUMENTS

WO    WO 2004/034103 A    4/2004

OTHER PUBLICATIONS

Pan et al., U.S. Appl. No. 11/366,195, filed Mar. 1, 2006, 58 pages.
Lee et al., U.S. Appl. No. 11/382,630, filed May 10, 2006, 54 pages.

* cited by examiner

*Primary Examiner*—David N Spector
(74) *Attorney, Agent, or Firm*—Fish & Richardson P.C.

(57) ABSTRACT

A spatial light modulator includes a two-dimensional array of hexagonal mirror plates disposed in a honeycomb pattern over a substrate. Each of the hexagonal mirror plates is supported by one or more structural members. There is a gap between adjacent hexagonal mirror plates. The structural members are not located in the gap.

27 Claims, 5 Drawing Sheets

HIGH FILL-RATIO MIRROR-BASED SPATIAL LIGHT MODULATOR

BACKGROUND

The present disclosure relates to micro-mirror based spatial light modulators.

A spatial light modulator can include an array of tiltable micro mirrors. A micro mirror built on a substrate can include a tiltable mirror plate that can be tilted by electrostatic forces. The mirror plate tilts to an "on" position, wherein the micro mirror plate directs incident light to a display device, and to an "off" position, wherein the micro mirror plate directs incident light away from the display device. The mirror plate can be stopped by mechanical stops at the "on" or the "off" positions so that the orientation of the mirror plate can be precisely defined at these two positions. For the micro mirror to properly function, the mirror plate must be able to promptly change between the "on" or the "off" positions without any delay. The mirror plates in a spatial light modulator can be selectively tilted to "on" or "off" positions to form a display image. A desirable performance for the spatial light modulator in a display application is to provide bright and high contrast display images.

SUMMARY

In one general aspect, the present invention relates to a spatial light modulator, including a two-dimensional array of hexagonal mirror plates disposed in a honeycomb pattern over a substrate, wherein each of the hexagonal mirror plates is supported by one or more structural members, there is a gap between adjacent hexagonal mirror plates and the structural members are not located in the gap.

In another general aspect, a spatial light modulator is described that includes a two-dimensional array of hexagonal mirror plates disposed in a honeycomb pattern over a substrate, wherein each of the hexagonal mirror plates is supported by one or more structural members, there is a gap between adjacent hexagonal mirror plates, the structural members are not located in the gap and the distance between a structural member of a mirror plate and the upper surface of the mirror plate is less than 1 micron.

In yet another aspect, a spatial light modulator is described having a two-dimensional array of hexagonal mirror plates disposed in a honeycomb pattern over a substrate, wherein each of the hexagonal mirror plates is supported by a structure, wherein the structure is located between two corners of the hexagonal mirror plate and the structure is at least partially under the hexagonal mirror plate.

In another general aspect, a spatial light modulator is described having a two-dimensional array of hexagonal mirror plates disposed in a honeycomb pattern over a substrate, wherein adjacent hexagonal mirror plates in the two-dimensional array are separated by gaps less than 2 micron.

In another general aspect, a spatial light modulator is described having a two-dimensional array of hexagonal mirror plates disposed in a honeycomb pattern over a substrate, wherein each of the hexagonal mirror plates is supported by one or more structural members, wherein at least one of the structural members is located in the vicinity of the middle of an edge of the hexagonal mirror plate and the structural member is at least partially under the hexagonal mirror plate.

Implementations of the system may include one or more of the following. The one or more structural members can each be supported by a support post in connection with the substrate. The support post can be hidden under the hexagonal mirror plate At least one of the hexagonal mirror plates can configured to tilt around the one or more structural members supporting the hexagonal mirror plate. At least one of the hexagonal mirror plates can include a cavity having an opening on the lower surface and at least one of the structural members associated with the hexagonal mirror plate extends into the cavity. At least one of the mirror plates does not include a hole in its upper surface. The spatial light modulator can further include a mechanical stop over the substrate, wherein the mechanical stop is configured to contact one of the hexagonal mirror plates to stop the movement of the hexagonal mirror plate when the hexagonal mirror plate tilts around the one or more structural members supporting the hexagonal mirror plate. Adjacent hexagonal mirror plates in the two-dimensional array can be separated by gaps less than 2 micron. Adjacent hexagonal mirror plates in the two-dimensional array can be separated by gaps less than 1 micron. Adjacent hexagonal mirror plates in the two-dimensional array can be separated by gaps less than 0.5 micron. The upper surfaces of the hexagonal mirror plates can occupy at least 85% of the area of the two-dimensional array. The upper surfaces of the hexagonal mirror plates can occupy at least 90% of the area of the two-dimensional array.

The upper surfaces of the hexagonal mirror plates can occupy at least 95% of the area of the two-dimensional array. The distance between a structural member and the upper surface of the associated hexagonal mirror plate can be less than 1 micron. The distance between a structural member and the upper surface of the associated hexagonal mirror plate can be less than 0.5 micron.

Implementations may include one or more of the following advantages. The disclosed methods and systems provide a micro-mirror based spatial light modulator that can produce bright and high contrast display images. The spatial light modulator can include an array of tiltable hexagonal mirrors that are distributed in honey-comb shaped cells. The disclosed hexagonal mirrors include reflective upper surfaces that have no holes, which in some instances may be an improvement over some of the conventional mirror designs that include holes in the mirror plates. Holes in the mirror plates are known to scatter light and reduce the contrast and sharpness of the display images. The elimination of holes in the disclosed hexagonal mirrors may therefore improve the contrast and sharpness in the display image as compared to conventional mirror based display systems.

The disclosed methods and systems provide an array of tiltable hexagonal mirrors with high fill-in ratios, which may more fully utilizes incident light and reduce light loss, producing brighter display images. Unlike some conventional mirror-based spatial light modulators that include flexure hinges exposed in the gaps between adjacent mirror plates, the disclosed hexagonal mirrors do not require structural members on the substrate between adjacent mirror plates. Several features of the structures of the hexagonal mirrors can enable small gaps between adjacent hexagonal mirrors and thus denser packing of the hexagonal mirrors. The hexagonal mirrors can include hinge components that extend into cavities having opening at the lower surfaces of the mirror plates. The hinge components can be completely hidden to an observer of the top of the mirror plates, because the hinge components are under the hexagonal mirror plates. The disclosed hexagonal mirror plate can tilt about a rotation axis defined by the one or more hinge components associated with the mirror plate. The positions of the hinge components can allow the rotation axis to be located in the mirror plate, which minimizes the lateral movement at the edges of the hexagonal mirror plate during the tilt movement of the hexagonal mirror.

Moreover, the adjacent micro mirrors do not have to be spaced apart to leave room for any structures that are required in some conventional micro-mirror systems. These advantageous features may allow the disclosed hexagonal mirror plates to be closely disposed with small gaps between adjacent mirror plates while still providing enough clearance for the tilt movement of the adjacent hexagonal mirror plates.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles, devices and methods described herein.

DETAILED DESCRIPTION

Figure 1:
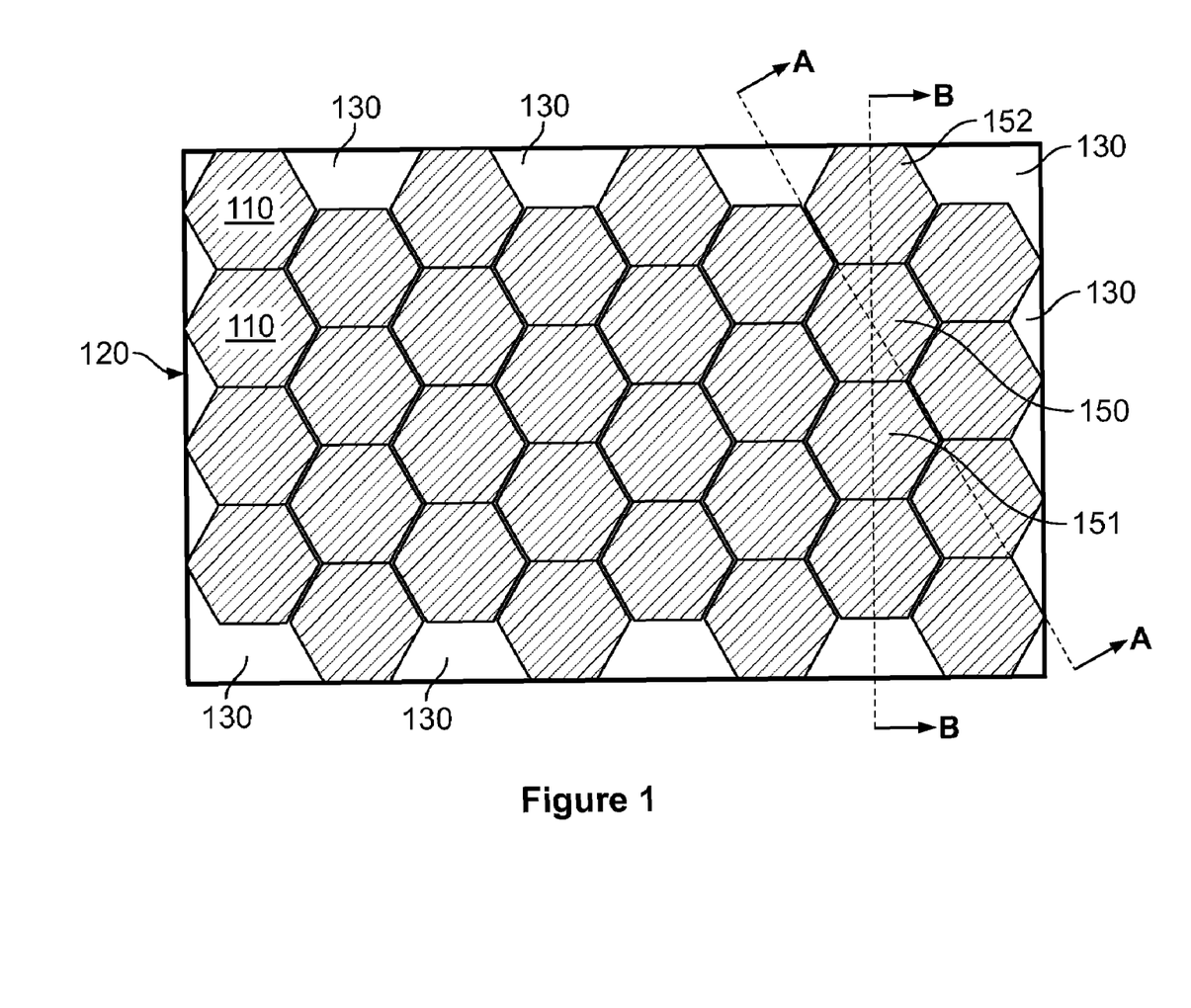
FIG. 1 is a plan view of an array of hexagonal mirrors.
Figure 2:
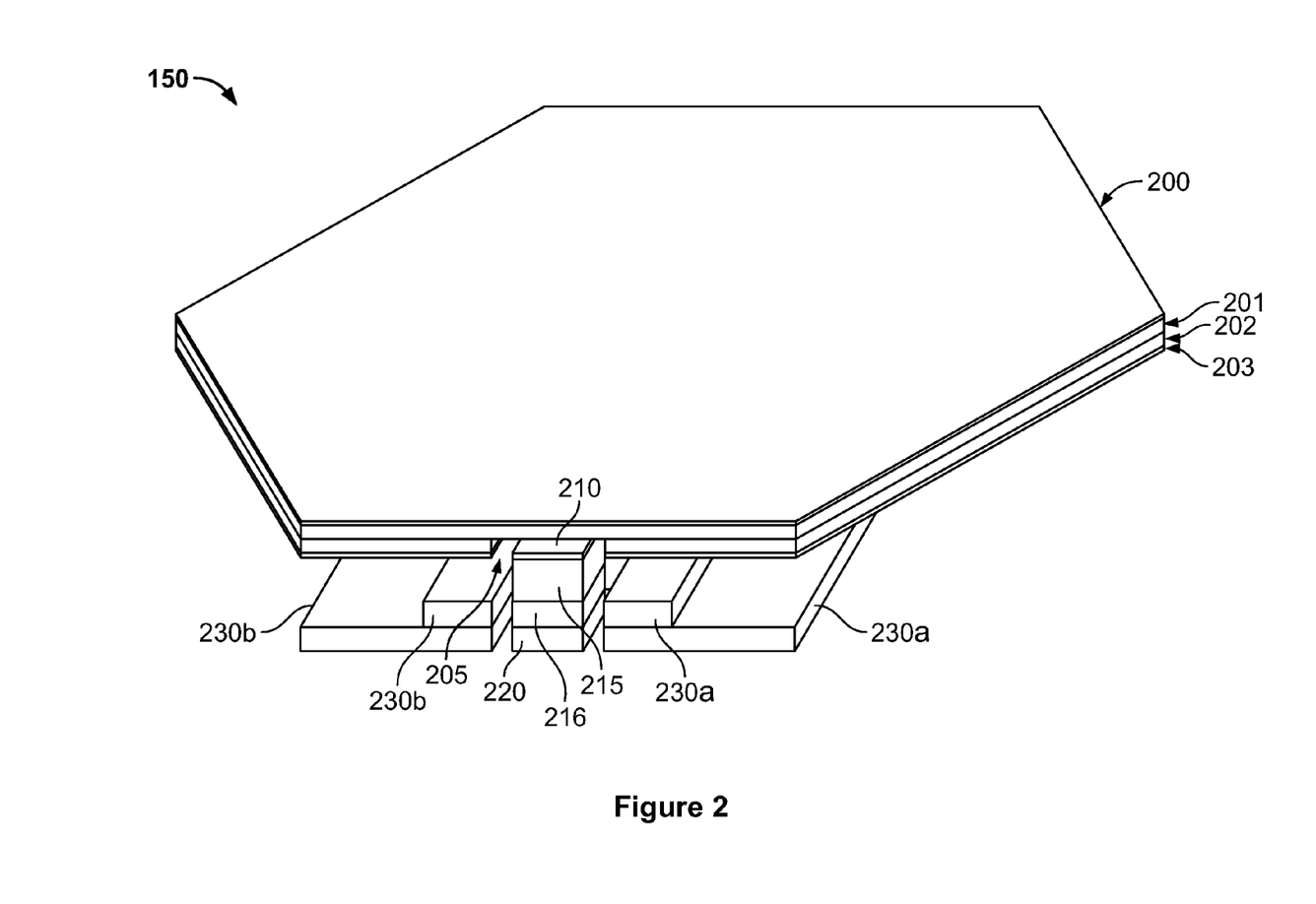
FIG. 2-4 are respectively a perspective top view, a perspective side view, and a perspective bottom view of a hexagonal mirror in FIG. 1.
Figure 3:
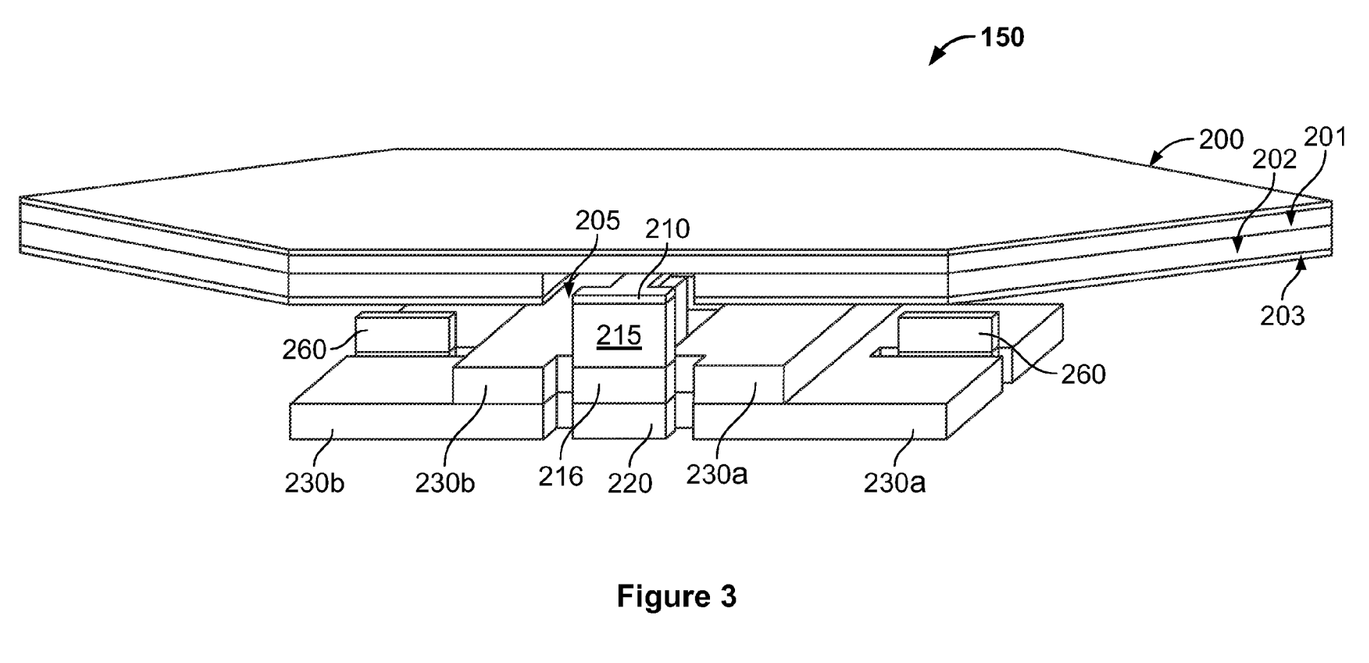
Figure 4:
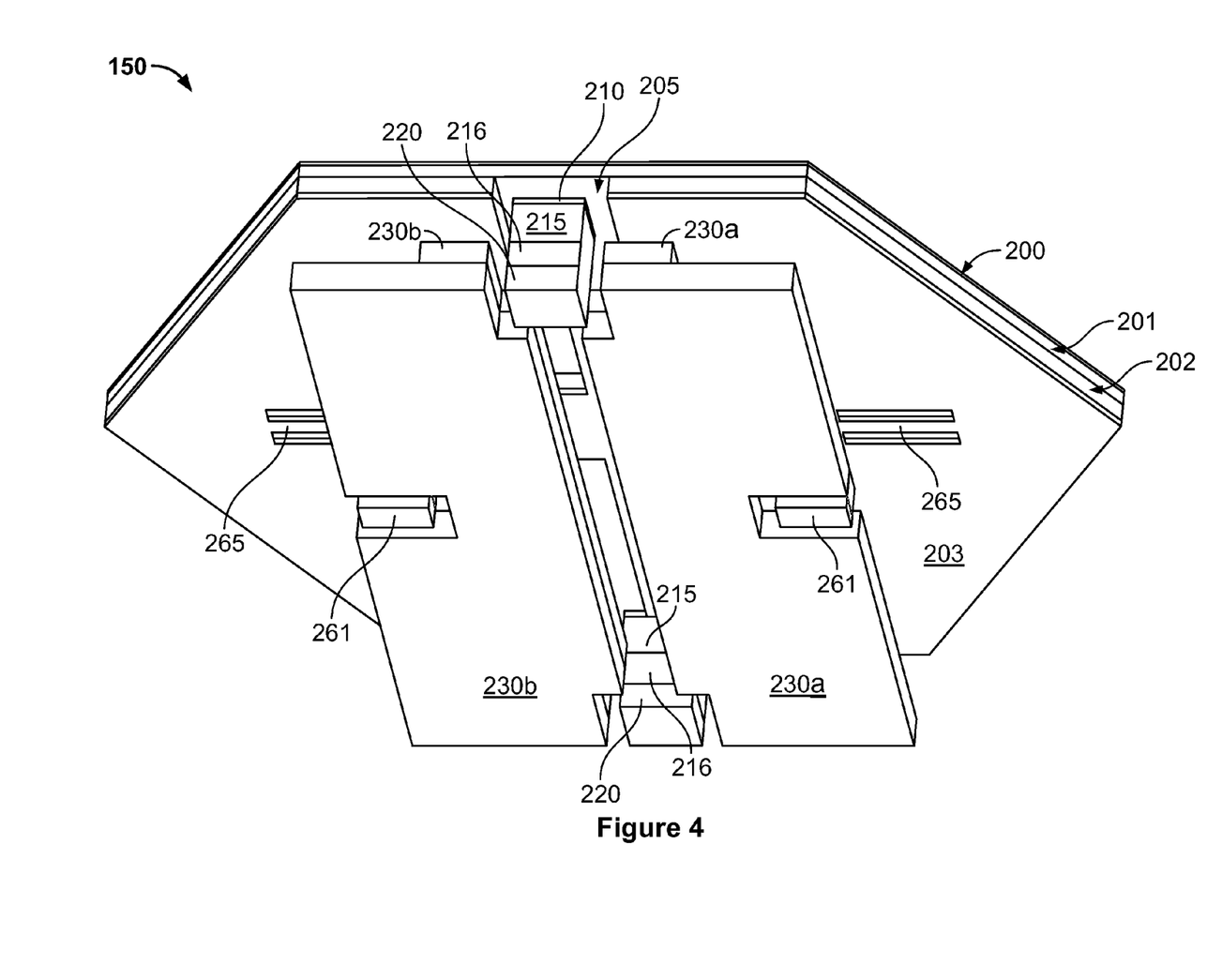
Figure 5:
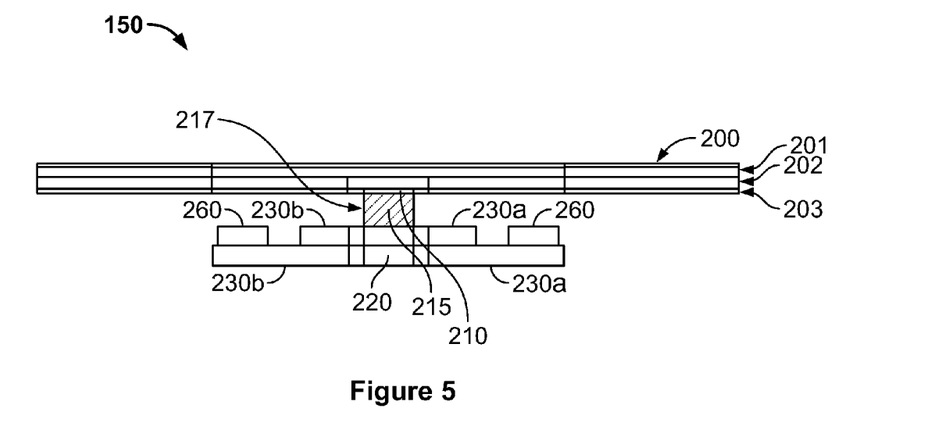
FIG. 5 is a side view of a hexagonal mirror when viewed perpendicular to the line A-A in FIG. 1.

FIG. 1 is a top view of an array 100 that is compatible with a spatial light modulator. The array 100 includes a plurality of hexagonal mirrors 110 distributed in a honey-comb pattern. The array 100 is bounded by a boundary 120, which can form a simple polygonal or circular shape, such as a rectangle, as shown, or a circle, hexagon, triangle, square, or other polygon. Adjacent hexagonal mirrors 150-152 are separated by gaps 751 and 752 (shown in FIG. 6). Each mirror plate and half the gap area between a mirror plate and its neighboring plates defines a cell. Inactive areas 130 can exist between the array 100 and the boundary 120.

The upper surfaces of the hexagonal mirrors 110 are reflective. The reflective surfaces enable the hexagonal mirrors 110 to reflect light. The mirrors are tiltable, which controls where the reflected light is directed. The total active area for the array 100 is the sum of the reflective upper surface areas of all the hexagonal mirrors 110 in the array 100. The inactive areas within the boundary 120 include the inactive areas 130 and gaps within the boundary. Although only a few dozen mirrors are shown, the array 100 can include hundreds to thousands of micro mirrors 110 along each dimension. For example, the array 100 can include 1024 micro mirrors 110 along one dimension and 1536 micro mirrors along the other dimension.

A "fill-in" ratio can be defined as the percentage of the active area within a cell in a mirror array. In the example illustrated in FIG. 1, the fill-in ratio is the sum of the total area of the reflective upper surfaces of all the hexagonal mirrors 110 divided by the total areas for all the cells in the array 100. In other words, the fill-in ratio is approximately the ratio of the total reflective area in the array 100 divided by the difference between the area within the rectangular boundary 120 and the inactive areas 130. The fill-in ratio can indicate the reflective efficiency for an array of micro mirrors. A mirror array having large gaps between adjacent mirror plates loses more incident light in the gaps than a mirror array having smaller gaps between adjacent mirrors. The former therefore has a lower fill-in ratio than the latter.

Referring to FIGS. 2-5, a single hexagonal mirror 150 includes a hexagonal mirror plate 200. In some embodiments, the mirror plate 200 includes a reflective upper layer 201, a middle layer 202, and a lower layer 203. The reflective upper layer 201 can be made of a metallic material such as aluminum, gold, or one of their alloys. The middle layer 202 provides mechanical strength to the mirror plate. The middle layer 202 also includes a portion of a cavity 205. The middle layer 202 can include silicon, polysilicon, amorphous silicon, aluminum, titanium, tantalum, tungsten, molybdenum, and silicides or alloys of aluminum, titanium, tantalum, tungsten, or molybdenum. The lower layer 203 can be made of an electrically conductive material such as aluminum, doped silicon, polysilicon, amorphous silicon, aluminum-silicon alloys, titanium, tantalum, tungsten, molybdenum, and silicides or alloys of aluminum, titanium, tantalum, tungsten or molybdenum. The lower layer 203 includes a portion of the cavity 205 that has an opening at the lower surface of the lower layer 203.

The hexagonal mirror 150 also includes a hinge component 210 that extends into the cavity 205. The hinge component 210 is connected with the lower layer 203 through a connection portion and with an upper portion 215 of a hinge support post 217. The hinge component 210, upper portion 215 and the hinge support post 217 are under the hexagonal mirror plate 200 and can be hidden from above the hexagonal mirror plate 200. That is, the hinge component 210, upper portion 215 and hinge support post 217 do not extend beyond the footprint of the hexagonal mirror 150. The hinge component 210 and the hinge support post 215 are located in the vicinity of the middle of an edge of the hexagonal mirror plate 200, between two corners of the mirror 150.

The upper portion 215 of the hinge support post 217 is connected with an electrode 220 via a lower portion 216 of the hinge support post 217. The hinge component 210, the upper portion 215 of the hinge support post 217, and the lower portion 216 of the hinge support post 217 are made of electrically conductive materials, which allow the electric potential of the lower layer 203 to be controlled by a voltage signal applied to the electrode 220. The electrically conductive materials can include silicon, polysilicon, amorphous silicon, aluminum, titanium, tantalum, tungsten, molybdenum, and silicides or alloys of aluminum, titanium, tantalum, tungsten, or molybdenum. One or more step electrodes 230a and 230b are also disposed over the substrate (not shown for illustration clarity) under the mirror plate 200. Each of the step electrodes 230a and 230b includes a lower layer and an upper layer. Each of the step electrodes 230a and 230b can receive voltage signals to establish electrostatic potential differences between the lower layer 203 and the step electrodes 230a or 230b. As a result, an electrostatic force can be produced over the mirror plate 200. The voltage signals applied to the electrode 220 and the step electrodes 230s and 230b can be designed to produce an electrostatic torque to tilt the mirror plate 200. The typical diagonal dimension for the hexagonal mirror plate 200 is in the range of 1 to 100 microns.

One or more landing stops 260 can be provided over the substrate. The tilt movement of the mirror plate 200 can be stopped when the mirror plate 200 comes to contact with one of the landing stops 260. The landing stops 260 can be made of electrically conductive materials. The electric potential of the landing stops 260 can be controlled by electrodes 261. The electrodes 261 can be connected with the electrode 220 such that landing stops 260 are at the same voltage as the lower layer 203 of the mirror plate 200. The equal potential between the lower layer 203 and the landing stops 260 assures that the voltage of the lower plate 203 is maintained when it comes to contact with one of the landing stops 260.

The lower layer 203 can further include one or more cavities each having an opening in its lower surface. A deflectable cantilever 265 in connection with the lower layer 203 extends into the cavity 205. The tilt movement of the mirror plate 200 can be stopped when a landing stop 260 contacts the corresponding cantilever 265 on the mirror plate 200. The cantilever is deflectable and slightly bent by the pressure applied by the landing stop 260. The elastic energy stored in the distorted cantilever 265 can be released to cause the mirror plate 200 to snap back during the separation of the mirror plate 200 from the landing stop 260. The release of the elastic distortion energy can help overcome stiction between the landing stop 260 and the mirror plate 200. Details about the structures and the fabrication of the cantilever in the mirror plate are disclosed in the commonly assigned U.S. patent application Ser. No. 11/366,195, entitled "Spatial Light Modulator Having a Cantilever Anti-Stiction Mechanism", filed Mar. 1, 2006.

The lateral dimensions of the mirror plate 200 extend beyond the lateral dimensions of the hinge component 210, and the upper portion 215 and the lower portion 216 of the hinge support post 217. In other words, the hinge component 210, the upper portion 215 of a hinge support post 217, and the lower portion 216 of a hinge support post 217 are completely hidden under the mirror plate 200 when viewed from above the mirror plate 200. The step electrodes 230a, 230b and the landing stop 260 can also be hidden under the mirror plate 200. No support structures are needed outside the lateral dimensions of the mirror plate 200 (i.e., in the gaps 751 and 752) over the substrate. This is one reason that the adjacent mirror pates 150-152 can be closely positioned and separated by only small gaps 751 and 752. The above disclosed mirror design is also an improvement over some conventional micro mirror systems that include structures on the substrate between adjacent mirrors. These conventional mirror systems require much larger gaps between adjacent mirrors to accommodate these structures.

Details about fabricating the tiltable micro mirrors are disclosed in the commonly assigned U.S. patent application Ser. No. 10/974,468, tilted "High contrast spatial light modulator and method", filed Oct. 27, 2004, and the commonly assigned provisional U.S. patent application Ser. No. 60/750, 506, tilted "System and Method for Making a Micro-Mirror Array Device", filed Dec. 14, 2005.

Figure 6:
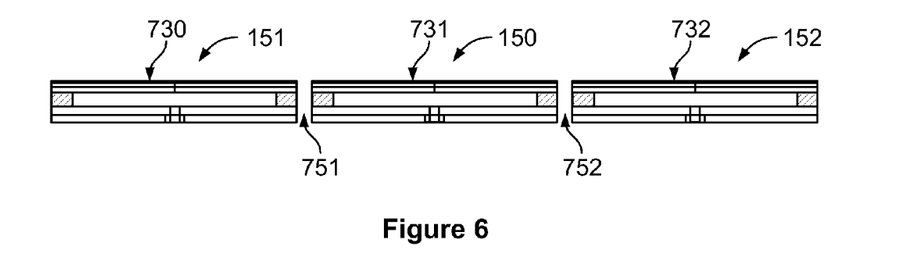
FIG. 6 is a side view of three adjacent hexagonal mirrors when viewed perpendicular to the line B-B in FIG. 1.
Figure 7:
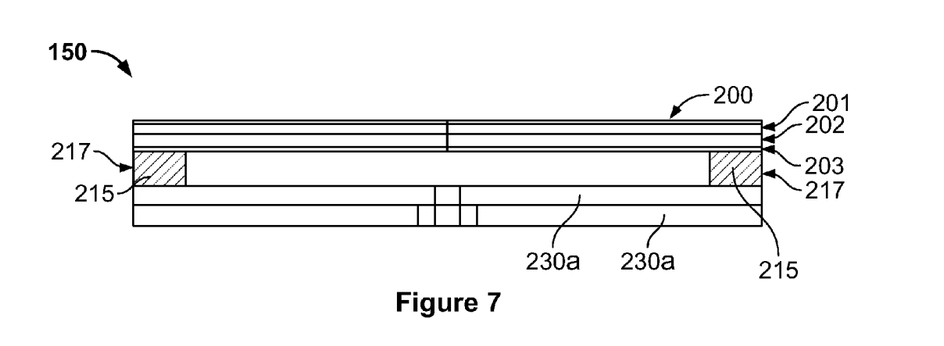
FIG. 7 is a side view of a hexagonal mirror when viewed perpendicular to the line B-B in FIG. 1.

Referring to FIG. 6, the mirror plates of the hexagonal mirrors 150-152 are separated by gaps 751 and 752. Referring to FIG. 7, the upper portions 215 of the two hinge support posts 217 support two hinge components 210 (not visible in FIG. 6) that extend into the cavities 205 in the lower layer 203 in the hexagonal mirror plate 200. The two hinge components 210 can define a rotational axis about which the hexagonal mirror plate 200 can tilt. An advantageous feature of the disclosed hexagonal mirror is that the hinge components 210 extend into the cavity 205 in the lower layer of the mirror plate 200. Referring back to FIG. 7, the rotational axis for the tilt movement of the hexagonal mirror plate 200 is therefore within the lower layer of the mirror plate 200. As a result, the edges of the mirror plates 730, 731, 732 in the hexagonal mirrors 150-152 experience mostly vertical displacement during the tilting of the mirror plates 730, 731, 732. The mirror plates 730, 731, 732 can therefore be closely spaced without interfering with one another's tilting. In some embodiments, the gaps 751 and 752 can be smaller than 2 microns, such as less than 1 micron or less than 0.5 micron.

Due to the above described advantageous features of the hexagonal mirrors 150-152, the gaps 751 and 752 can be kept very small. In some implementations, the fill-in ratio of the array 100 hexagonal mirrors 110 can be over 85%, 90%, 93% or 95%.

Another advantageous feature of the disclosed hexagonal mirror is that the upper layer 201 does not include a hole in its reflective upper surface. Holes in the mirror plates in some conventional micro-mirror based display systems are known to scatter light, and reduce the contrast and sharpness of the display images. The elimination of holes in the disclosed hexagonal mirrors can provide improved contrast and sharpness in the display image as compared to these conventional micro-mirror based display systems.

Still another advantageous feature of the disclosed array of hexagonal mirrors is that the gaps between the hexagonal mirrors are not distributed in a set of periodic straight lines across the whole array as in an array of rectangular mirrors. Moreover, the corners of a hexagonal mirror are more obtuse than the right angles in a rectangular mirror. These advantageous features allow the disclosed array of hexagonal mirrors to produce less stray light caused by unwanted diffractions and scatterings.

Although multiple embodiments have been shown and described, it will be understood by persons skilled in the relevant art that various changes in form and details can be made therein without departing from the spirit and scope. For example, the exact design of the electrodes for producing electrostatic forces on the hexagonal mirror plates can vary. Furthermore, the substrates compatible with the disclosed system can include electronic circuits for controlling the hexagonal mirror plates. Moreover, the boundaries of the array of the hexagonal mirrors can take many shapes such as rectangular, hexagonal, or round.

The content of all patents and publications described herein are incorporated by reference for all purposes.

What is claimed is:

1. A spatial light modulator, comprising:
   a two-dimensional array of hexagonal mirror plates disposed in a honeycomb pattern over a substrate, wherein each of the hexagonal mirror plates is supported by one or more structural members, there is a gap between adjacent hexagonal mirror plates, and the one or more structural members are not located in the gap, wherein the upper surfaces of the hexagonal mirror plates occupy at least 90% of the area of the two-dimensional array.

2. The spatial light modulator of claim 1, wherein the one or more structural members supporting one of the hexagonal mirror plates includes a support post on the substrate and the support post is hidden under the hexagonal mirror plate.

3. The spatial light modulator of claim 2, wherein at least one of the hexagonal mirror plates is configured to tilt around a hinge connected to the support post.

4. A spatial light modulator, comprising:
   a two-dimensional array of hexagonal mirror plates disposed in a honeycomb pattern over a substrate, wherein each of the hexagonal mirror plates is supported by one or more structural members, there is a gap between adjacent hexagonal mirror plates, and the one or more structural members are not located in the gap and include a support post on the substrate where the support post is hidden under the hexagonal mirror plate and each hexagonal mirror plate is configured to tilt around a hinge connected to the support post; and
   a mechanical stop on the substrate, wherein the mechanical stop is configured to contact one of the hexagonal mirror plates to stop the movement of the hexagonal mirror plate when the hexagonal minor plate tilts around the hinge.

5. The spatial light modulator of claim 4, wherein the distance between the hinge and the upper surface of the hexagonal mirror plate is less than 1 micron.

6. The spatial light modulator of claim 5, wherein the distance between the hinge and the upper surface of the hexagonal minor plate is less than 0.5 micron.

7. The spatial light modulator of claim 1, wherein adjacent hexagonal mirror plates in the two-dimensional array are separated a gap less than 2 microns.

8. The spatial light modulator of claim 7, wherein adjacent hexagonal mirror plates in the two-dimensional array are separated by a gap less than 1 micron.

9. The spatial light modulator of claim 8, wherein adjacent hexagonal mirror plates in the two-dimensional array are separated by a gap less than 0.5 micron.

10. The spatial light modulator of claim 4, wherein the upper surfaces of the hexagonal mirror plates occupy at least 85% of the area of the two-dimensional array.

11. The spatial light modulator of claim 4, wherein the upper surfaces of the hexagonal mirror plates occupy at least 90% of the area of the two-dimensional array.

12. The spatial light modulator of claim 1, wherein the upper surfaces of the hexagonal mirror plates occupy at least 95% of the area of the two-dimensional array.

13. The spatial light modulator of claim 1, wherein at least one of the hexagonal mirror plates comprises a recess in a lower surface and at least one of the structural members associated with the hexagonal mirror plate extends into the cavity.

14. The spatial light modulator of claim 1, wherein at least one of the mirror plates is free of holes in its upper surface.

15. A spatial light modulator, comprising:
a two-dimensional array of hexagonal mirror plates disposed in a honeycomb pattern over a substrate, wherein adjacent hexagonal mirror plates in the two-dimensional array are separated by a gap less than 1 micron, each of the hexagonal mirror plates is supported by a structural member extending between the substrate and hexagonal mirror plate and the structural member is within a footprint of the hexagonal mirror plate.

16. The spatial light modulator of claim 15, wherein the hexagonal mirror plates are free from holes in the upper surfaces.

17. The spatial light modulator of claim 15, wherein adjacent hexagonal mirror plates in the two-dimensional array are separated by a gap less than 0.5 micron.

18. The spatial light modulator of claim 15, wherein the upper surfaces of the hexagonal mirror plates occupy at least 85% of the area of the two-dimensional array.

19. The spatial light modulator of claim 18, wherein the upper surfaces of the hexagonal mirror plates occupy at least 95% of the area of the two-dimensional array.

20. The spatial light modulator of claim 15, wherein at least one of the hexagonal mirror plates is configured to tilt around a hinge connected to the structural member.

21. The spatial light modulator of claim 20, wherein at least one of the hexagonal mirror plates comprises a cavity having an opening on the lower surface and the structural member extends into the cavity.

22. The spatial light modulator of claim 20, wherein the distance between structural member and the upper surface of the associated hexagonal mirror plate is less than 1 micron.

23. The spatial light modulator of claim 22, wherein the distance between the structural member and the upper surface of the associated hexagonal mirror plate is less than 0.5 micron.

24. The spatial light modulator of claim 15, wherein the at least 90% of the area of the two-dimensional array is reflective.

25. The spatial light modulator of claim 15, wherein the at least 95% of the area of the two-dimensional array is reflective.

26. The spatial light modulator of claim 1, wherein the at least 90% of the area of the two-dimensional array is reflective.

27. The spatial light modulator of claim 1, wherein the at least 95% of the area of the two-dimensional array is reflective.

* * * * *

UNITED STATES PATENT AND TRADEMARK OFFICE
CERTIFICATE OF CORRECTION

PATENT NO. : 7,391,554 B2  Page 1 of 1
APPLICATION NO. : 11/467367
DATED : June 24, 2008
INVENTOR(S) : Shaoher X. Pan

It is certified that error appears in the above-identified patent and that said Letters Patent is hereby corrected as shown below:

Column 7, Line 2 at Claim 4; replace:
"plate when the hexagonal minor plate tilts around the" with
-- plate when the hexagonal mirror plate tilts around the --

Column 7, Line 9 at Claim 6; replace:
"agonal minor plate is less than 0.5 micron." with
-- agonal mirror plate is less than 0.5 micron. --

Signed and Sealed this

Ninth Day of September, 2008

JON W. DUDAS
*Director of the United States Patent and Trademark Office*